United States Patent
Sugie (10) Patent No.: US 12,015,339 B2
(45) Date of Patent: Jun. 18, 2024

(54) POWER SUPPLY CIRCUIT

(71) Applicant: ROHM CO., LTD., Kyoto (JP)

(72) Inventor: Hisashi Sugie, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 18/169,454

(22) Filed: Feb. 15, 2023

(65) Prior Publication Data

US 2023/0268829 A1    Aug. 24, 2023

(30) Foreign Application Priority Data

Feb. 18, 2022 (JP) .................... 2022-024107

(51) Int. Cl.
   *H02M 3/07*       (2006.01)
   *G05F 1/46*        (2006.01)
   (Continued)

(52) U.S. Cl.
   CPC .............. *H02M 3/07* (2013.01); *G05F 1/468* (2013.01); *G05F 1/565* (2013.01); *G05F 1/575* (2013.01); *H02M 1/0045* (2021.05)

(58) Field of Classification Search
   USPC ................ 327/536; 363/59–61; 307/110
   See application file for complete search history.

(56) References Cited

U.S. PATENT DOCUMENTS

| | | | |
|---|---|---|---|
| 6,438,005 B1 * | 8/2002 | Walter | H02M 3/07 363/60 |
| 6,654,263 B2 * | 11/2003 | Kurotsu | H02M 3/07 363/60 |

(Continued)

FOREIGN PATENT DOCUMENTS

JP    2012050243 A    3/2012

*Primary Examiner* — Thomas J. Hiltunen
(74) *Attorney, Agent, or Firm* — CANTOR COLBURN LLP (57) ABSTRACT

A linear regulator adjusts an intermediate voltage $V_{REGOUT}$ at an output node such that an output voltage $V_{OUT}$ at an output terminal approaches a first target voltage $V_{OUT(REF1)}$. A Dixon-type charge pump circuit enters a disable state when the output voltage $V_{OUT}$ is higher than a threshold voltage $V_{TH(CP)}$ determined to be lower than the first target voltage $V_{OUT(REF1)}$, outputs the intermediate voltage $V_{REGOUT}$ at a first input node to the output node in the disable state, enters an enable state when the output voltage $V_{OUT}$ is lower than the threshold voltage $V_{TH(CP)}$, and stabilizes the output voltage $V_{OUT}$ at the output terminal to a second target voltage $V_{OUT(REF2)}$ determined to be lower than the first target voltage $V_{OUT(REF1)}$ in the enable state.

10 Claims, 10 Drawing Sheets

(51) Int. Cl.
  *G05F 1/565*  (2006.01)
  *G05F 1/575*  (2006.01)
  *H02M 1/00*  (2006.01)

(56) References Cited

U.S. PATENT DOCUMENTS

| | | | | |
|---|---|---|---|---|
| 7,550,954 | B2* | 6/2009 | De Nisi | H02M 1/10 |
| | | | | 307/45 |
| 9,531,259 | B2* | 12/2016 | Tamura | H02M 3/07 |
| 10,491,114 | B1* | 11/2019 | Zhang | G05F 1/462 |
| 11,258,360 | B2* | 2/2022 | Tsai | H02M 3/158 |
| 2005/0258891 | A1* | 11/2005 | Ito | H02M 3/07 |
| | | | | 327/538 |
| 2006/0082351 | A1* | 4/2006 | Martins | H02J 9/005 |
| | | | | 323/268 |
| 2022/0311321 | A1* | 9/2022 | Venturelli | H02M 3/07 |

* cited by examiner

POWER SUPPLY CIRCUIT

CROSS REFERENCES TO RELATED APPLICATIONS

The present invention claims priority under 35 U.S.C. § 119 to Japanese Application, 2022-024107, filed on Feb. 18, 2022, the entire contents of which being incorporated herein by reference.

BACKGROUND

Technical Field

The present disclosure relates to a power supply circuit.

Description of the Related Art

A power supply circuit is used to supply an appropriate power supply voltage to an integrated circuit (IC), a circuit block in the IC, or various load circuits. As the power supply circuit, a linear regulator, a switching regulator such as a buck converter or a boost converter, a charge pump circuit, and the like have been known, and are selected according to a voltage-level relationship between an input voltage and an output voltage.

Specifically, in a case where a target level of the output voltage is lower than the input voltage of the power supply voltage, the linear regulator or the buck converter is used. Conversely, in a case where the target level of the output voltage is higher than the input voltage of the power supply voltage, the charge pump circuit or the boost converter is used.

A power supply circuit (internal power supply circuit) built in any functional IC will be considered. The internal power supply circuit generates a power supply voltage for a circuit block in the same functional IC. In this case, a target level of an output voltage of the internal power supply circuit is determined by a circuit block serving as a load. On the other hand, an input voltage of the internal power supply circuit is a power supply voltage supplied to the functional IC. Accordingly, a magnitude relationship between the input voltage and the output voltage of the internal power supply circuit is determined in response to a power supply voltage of the application circuit (platform) in which the functional IC is used.

If a functional IC is provided with an internal power supply circuit capable of operating in both an application circuit in which a target level of an output voltage is higher than a target level of an input voltage and an application circuit in which a target level of an output voltage is lower than a target level of an input voltage, such a functional IC can be used for a plurality of application circuits, and the plurality of application circuits can be easily designed.

SUMMARY

The present disclosure has been made in such a situation, and a general purpose of one embodiment thereof is to provide a power supply circuit capable of coping with a wide range of input voltages.

One embodiment of the present disclosure relates to a power supply circuit. The power supply circuit includes an input terminal to be connected to receive an input voltage, an output terminal to be connected to a load, a linear regulator having an input node connected to the input terminal, and an output node, and structured to adjust an intermediate voltage at the output node such that an output voltage at the output terminal approaches a first target voltage, and a Dixon-type charge pump circuit having a first input node connected to receive the intermediate voltage, a second input node connected to receive the input voltage, and an output node connected to the output terminal. The charge pump circuit is structured to enter a disable state when the output voltage is higher than a threshold voltage determined to be lower than the first target voltage, to output the voltage at the first input node to the output node in the disable state, to enter an enable state when the output voltage is lower than the threshold voltage, and to stabilize the output voltage to a second target voltage determined to be lower than the first target voltage in the enable state.

Another embodiment of the present disclosure is also a power supply circuit. The power supply circuit includes an input terminal to be connected to receive an input voltage, an output terminal, a first transistor having a source connected to the input terminal, an error amplifier structured to amplify an error between a reference voltage and a feedback voltage corresponding to an output voltage at the output terminal, and having an output connected to a gate of the first transistor, a flying capacitor, a driver circuit structured to apply a switching voltage switching between a high voltage corresponding to the input voltage and a low voltage being a ground voltage to one end of the flying capacitor, a first rectifier element connected between another end of the flying capacitor and a drain of the first transistor, a second rectifier element connected between the another end of the flying capacitor and the output terminal, and a controller structured to activate the driver circuit in an enable state, and to stop the driver circuit in a disable state.

Note that, any combinations of the above components and mutual replacements of components and expressions among methods, apparatuses, systems, and the like are also effective as embodiments of the present disclosure or the present invention. Furthermore, the description of this item (means for solving the problem) does not describe all essential features of the present invention, and thus subcombinations of these described features may also be the present invention.

According to one embodiment of the present disclosure, it is possible to provide a power supply circuit capable of coping with a wide range of input voltages.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DETAILED DESCRIPTION

Outline of Embodiment

An outline of some illustrative embodiments of the present disclosure will be described. This outline describes some concepts of one or a plurality of embodiments in a simplified manner for the purpose of basic understanding of the embodiment as an introduction of detailed description to be described below and does not limit the breadth of the invention or disclosure. This outline is not a comprehensive outline of all embodiments to be considered and is not intended to specify key elements of all the embodiments or delineate the scope of some or all of the embodiments. For the sake of convenience, "one embodiment" may be used to refer to one embodiment (example or modified example) or a plurality of embodiments (examples or modified examples) disclosed in the present specification.

A power supply circuit according to one embodiment includes an input terminal to be connected to receive an input voltage, an output terminal to be connected to a load, a linear regulator having an input node connected to the input terminal, and an output node, and structured to adjust an intermediate voltage at the output node such that an output voltage at the output terminal approaches a first target voltage, and a Dixon-type charge pump circuit having a first input node connected to receive the intermediate voltage, a second input node coupled to receive the input voltage, and an output node connected to the output terminal. The charge pump circuit is structured to enter a disable state when the output voltage is higher than a threshold voltage determined to be lower than the first target voltage, to output a voltage at the first input node to the output node in the disable state, to enter an enable state when the output voltage is lower than the threshold voltage, and to stabilize the output voltage to a second target voltage determined to be lower than the first target voltage in the enable state According to this configuration, in a state where the input voltage is sufficiently high, the charge pump circuit enters the disabled state, and the output voltage is stabilized at the first target voltage. When the input voltage decreases, the linear regulator circuit cannot maintain the output voltage at the first target voltage, and the output voltage falls below the threshold voltage, the charge pump circuit enters the enable state, and the output voltage can be stabilized at the second target voltage determined to be slightly lower than the first target voltage. Note that, since the linear regulator is operating even in a state where the input voltage decreases and enters a full-on state, the intermediate voltage close to the input voltage is supplied to the charge pump circuit. Since the linear regulator constantly operates, it is possible to prevent the output voltage from being discontinuously changed by switching the state.

In one embodiment, the charge pump circuit may further include a first comparator having hysteresis for comparing a monitoring voltage corresponding to the output voltage with an upper threshold and a lower threshold corresponding to the second target voltage. The charge pump circuit may repeat an operation period and a stop period in response to an output of the first comparator in the enable state. According to this configuration, in the enable state of the charge pump circuit, the output voltage can be stabilized in the voltage range determined by the upper threshold and the lower threshold.

In one embodiment, the charge pump circuit may include a flying capacitor, a driver circuit structured to alternately apply the input voltage and a ground voltage to a first end of the flying capacitor in the enable state, a first rectifier element provided between the first input node and a second end of the flying capacitor, and a second rectifier element provided between the second end of the flying capacitor and the output node.

In one embodiment, the charge pump circuit may further include a second comparator structured to compare the output voltage with a voltage at the second end of the flying capacitor in a section in which the first end of the flying capacitor is low during a period in which the charge pump circuit is in the enable state and structured to assert a stop signal when the output voltage is lower. The charge pump circuit may enter the disabled state when the stop signal is asserted. In a case where the capability of the charge pump circuit is lower than the load electric current, when the charge pump circuit is operated, a situation in which the output voltage is lower than the intermediate voltage. This situation can be detected by the second comparator, and the decrease in the output voltage can be suppressed by setting the charge pump circuit to enter the disabled state in response to the stop signal generated by the second comparator.

In one embodiment, the first rectifier element may be a first synchronization rectifier transistor structured to switch between on and off in the enable state, and to be in an on state in the disabled state, and the second rectifier element may be a second synchronization rectifier transistor structured to switch between on and off complementarily with the first synchronization rectifier transistor in the enable state, and to be in an on state in the disabled state.

In one embodiment, the first rectifier element and the second rectifier element may be diodes.

In one embodiment, the charge pump circuit may further include a second comparator structured to compare the output voltage with the intermediate voltage, and to assert a stop signal when the output voltage is lower. The charge pump circuit may enter the disabled state when the stop signal is asserted. In a case where the capability of the charge pump circuit is lower than the load electric current, when the charge pump circuit is operated, a situation in which the output voltage is lower than the intermediate voltage. This situation can be detected by the second comparator, and the decrease in the output voltage can be suppressed by setting the charge pump circuit to enter the disabled state in response to the stop signal generated by the second comparator.

In one embodiment, the power supply circuit may further include a second comparator structured to compare the output voltage with a voltage based on the input voltage, and to assert a stop signal when the output voltage is lower. The charge pump circuit may enter the disabled state when the stop signal is asserted. In a case where the capability of the charge pump circuit is lower than the load electric current, when the charge pump circuit is operated, a situation in which the output voltage is lower than the intermediate voltage. This situation can be detected by the second comparator, and the decrease in the output voltage can be suppressed by setting the charge pump circuit to enter the disabled state in response to the stop signal generated by the second comparator.

In one embodiment, the linear regulator may include a first transistor having a source connected to the input node and a drain connected to the output node, a second transistor having a source connected to the input node, a gate and a drain connected to a gate of the first transistor, and an error amplifier structured to receive a reference voltage and a feedback voltage corresponding to the output voltage, and having an output connected to the gate of the first transistor and the gate and the drain of the second transistor.

In one embodiment, the power supply circuit may be integrated on one semiconductor substrate. The term "integrally integrated" includes a case where all components of a circuit are formed on a semiconductor substrate and a case where main components of the circuit are integrally integrated, and some resistors, capacitors, and the like may be provided outside the semiconductor substrate for adjusting a circuit constant. By integrating circuits on one chip, a circuit area can be reduced, and characteristics of circuit elements can be kept uniform.

A power supply circuit according to one embodiment includes an input terminal connected to receive an input voltage, an output terminal, a first transistor having a source connected to the input terminal, an error amplifier structured to amplify an error between a reference voltage and a feedback voltage corresponding to an output voltage at the output terminal, and having an output connected to a gate of the first transistor, a flying capacitor, a driver circuit structured to apply a switching voltage switching between a high voltage corresponding to the input voltage and a low voltage which is a ground voltage to one end of the flying capacitor, a first rectifier element connected between another end of the flying capacitor and a drain of the first transistor, a second rectifier element connected between the other end of the flying capacitor and the output terminal, and a controller structured to activate the driver circuit in an enable state, and to stop the driver circuit in a disable state.

A gate driver circuit according to one embodiment drives an N-type high-side transistor. The gate driver circuit may include a switching terminal to which one end of the high-side transistor is connected, a bootstrap terminal, any one of the above power supply circuits, a rectifier element for bootstrap structured to be provided between an output terminal of the power supply circuit and the bootstrap terminal, and a pre-driver circuit structured to supply a bootstrap voltage at the bootstrap terminal to the gate of the high-side transistor so as to turn on the high-side transistor.

Embodiment

Hereinafter, a preferred embodiment will be described with reference to the drawings. The same or equivalent components, members, and processing illustrated in the drawings are denoted by the same reference signs, and the redundant description will be omitted as appropriate. In addition, the embodiment is not intended to limit the disclosure and invention but are examples, and all features described in the embodiment and combinations thereof are not necessarily essential to the disclosure and invention.

In the present specification, a "state where a member A is connected to a member B" includes not only a case where the member A and the member B are physically and directly connected to each other, but also a case where the member A and the member B are indirectly connected to each other with another member, which does not substantially influence an electrical connection state between these members or which does not impair a function or an effect exhibited by coupling these members, interposed therebetween.

Similarly, a "state where a member C is connected (provided) between the member A and the member B" includes not only a case where the member A and the member C or the member B and the member C are directly connected to each other, but also a case where these members are indirectly connected to each other with another member, which does not substantially influence an electrical connection state between these members or which does not impair a function or an effect exhibited by coupling these members, interposed therebetween.

Figure 1:
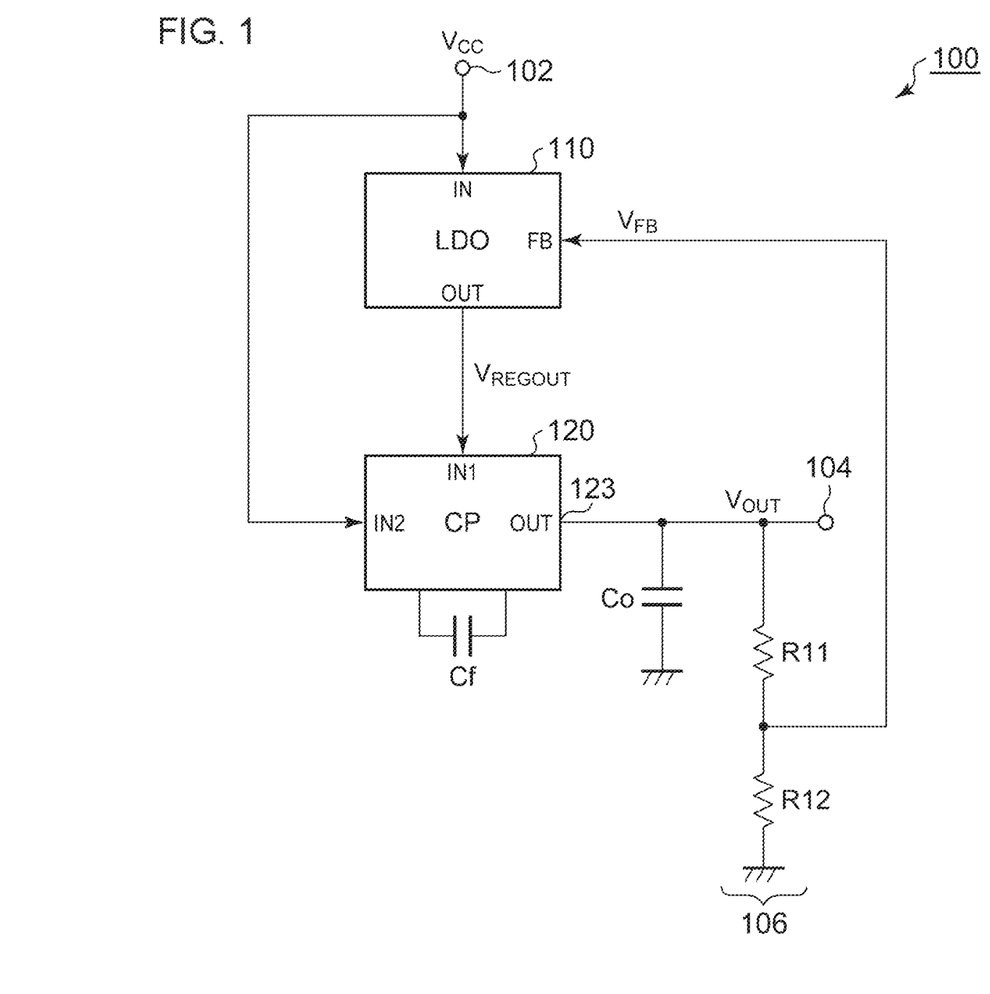
FIG. 1 is a circuit diagram of a power supply circuit according to an embodiment.

FIG. 1 is a circuit diagram of a power supply circuit 100 according to the embodiment. The power supply circuit 100 includes an input terminal 102 and an output terminal 104. The power supply circuit 100 receives an input voltage (power supply voltage) $V_{CC}$ at the input terminal 102 and supplies a stabilized output voltage $V_{OUT}$ to a load connected to the output terminal 104. For example, the output voltage $V_{OUT}$ is about 12 V, and the input voltage $V_{CC}$ can be taken between a first voltage (for example, 15 V, 24 V, or 60 V) higher than 12 V and a second voltage (for example, 6 V) lower than 12 V.

The power supply circuit 100 includes a linear regulator 110 and a charge pump circuit 120. The linear regulator 110 is also referred to as a low drop output (LDO) regulator and includes an input node IN connected to the input terminal 102, an output node OUT, and a feedback node FB. The linear regulator 110 receives, at the feedback node FB, a feedback voltage $V_{FB}$ corresponding to the output voltage $V_{OUT}$ generated at the output terminal 104 and adjusts an intermediate voltage $V_{REGOUT}$ generated at the output node OUT such that the feedback voltage $V_{FB}$ approaches a reference voltage $V_{REF}$, in other words, the output voltage $V_{OUT}$ approaches a first target voltage $V_{OUT(REF1)}$. The power supply circuit 100 includes a voltage divider circuit 106 including resistors R11 and R12. The feedback voltage $V_{FB}$ is a voltage obtained by dividing the output voltage $V_{OUT}$ by the resistors R11 and R12, and the first target voltage $V_{OUT(REF1)}$ is expressed by Equation (1).

$$V_{OUT(REF1)} = V_{REF} \times (R11+R12)/R12 \qquad (1)$$

The charge pump circuit 120 is a Dixon type, and includes a flying capacitor Cf, an output capacitor Co, a first input node IN1, a second input node IN2, and an output node OUT. The first input node IN1 is connected to the output node OUT of the linear regulator 110 and receives the intermediate voltage $V_{REGOUT}$. The second input node IN2 is connected to the input terminal 102 and receives the input voltage $V_{CC}$. The output node OUT of the charge pump circuit 120 is connected to the output terminal 104.

The charge pump circuit 120 can be switched between an enable state and a disabled state in response to the output voltage $V_{OUT}$. In the charge pump circuit 120, a threshold voltage $V_{TH(CP)}$ determined to be lower than the first target voltage $V_{OUT(REF1)}$ is set, and the charge pump circuit enters the disabled state when $V_{OUT} > V_{TH(CP)}$. The charge pump circuit 120 becomes through (conductive) in the disabled state, and outputs the intermediate voltage $V_{REGOUT}$ at the first input node IN1 to the output node OUT as it is. The output voltage $V_{OUT}$ at this time is expressed by the following Equation.

$$V_{OUT} = V_{REGOUT} - \Delta V_{CP}$$

$\Delta V_{CP}$ is a voltage drop across the charge pump circuit 120 in the disabled state.

The charge pump circuit 120 enters the enable state when $V_{OUT} < V_{TH(CP)}$. The charge pump circuit 120 operates in synchronization with a clock signal CLK in the enable state, charges the flying capacitor Cf with the intermediate voltage $V_{REGOUT}$ at the first input node IN1, and generates, at the output node (output capacitor Co), a voltage obtained by adding a voltage of the flying capacitor Cf to the input voltage $V_{CC}$ at the second input node IN2. When the charge pump circuit 120 is free run, the output voltage $V_{OUT}$ is expressed by the following Equation.

$$V_{OUT} = V_{CC} + V_{REGOUT}$$

The charge pump circuit 120 has an output regulation function and stabilizes the output voltage $V_{OUT}$ to a second target voltage $V_{OUT(REF2)}$ determined to be lower than the first target voltage $V_{OUT(REF1)}$ in the enable state. The second target voltage $V_{OUT(REF2)}$ can be determined to be substantially equal to the threshold voltage $V_{TH(CP)}$.

For example, when the first target voltage $V_{OUT(REF1)}$ is 12.5 V, the second target voltage $V_{OUT(REF2)}$ and the threshold voltage $V_{TH(CP)}$ can be about 11.5 V lower by 1 V than the first target voltage $V_{OUT(REF1)}$.

Figure 2:
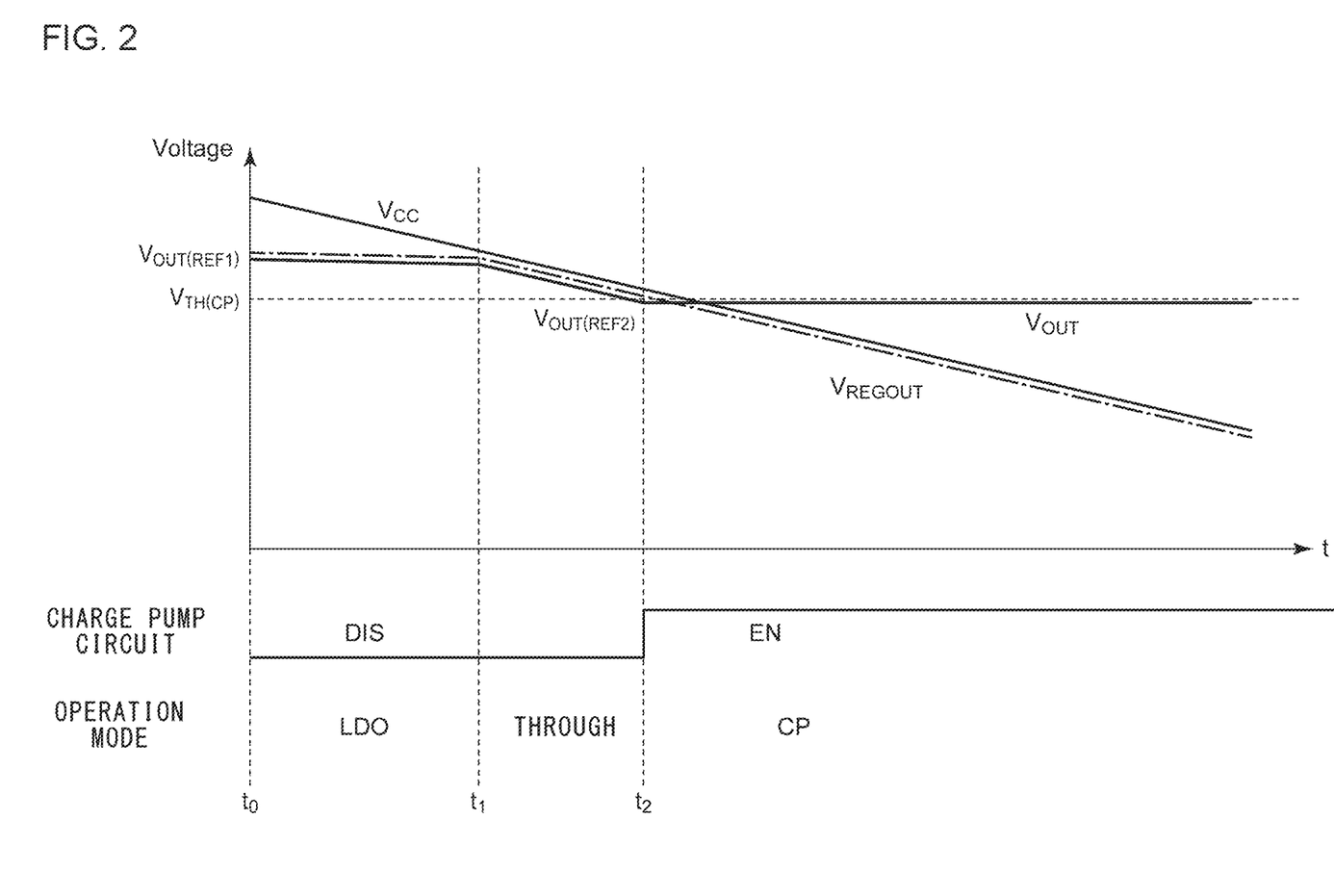
FIG. 2 is an operation waveform diagram of the power supply circuit of FIG. 1.

The above configuration is a basic configuration of the power supply circuit 100. Next, an operation of the power supply circuit 100 will be described. FIG. 2 is an operation waveform diagram of the power supply circuit 100 of FIG. 1. A scene in which the input voltage $V_{CC}$ decreases with time from a high voltage level to a low voltage level is illustrated.

Between times $t_0$ and $t_1$, the input voltage $V_{CC}$ is higher than the first target voltage $V_{OUT(REF1)}$, and the output voltage $V_{OUT}$ is stabilized to the first target voltage $V_{OUT(REF1)}$ by the linear regulator 110. This state is referred to as an LDO mode.

When the input voltage $V_{CC}$ becomes lower than the first target voltage $V_{OUT(REF1)}$, the linear regulator 110 cannot maintain the output voltage $V_{OUT}$ at the first target voltage $V_{OUT(REF1)}$, and the output voltage $V_{OUT}$ decreases together with the input voltage $V_{CC}$ (from $t_1$ to $t_2$). In this section from $t_1$ to $t_2$, an output transistor inside the linear regulator 110 is in a full-on state, and the intermediate voltage $V_{REGOUT}$ becomes a voltage level slightly lower than the input voltage $V_{CC}$.

$$V_{REGOUT} = V_{CC} - \Delta V_{LDO}$$

$\Delta V_{LDO}$ is a voltage drop across the linear regulator 110. Since $V_{OUT} > V_{TH(CP)}$, the charge pump circuit 120 is in the disabled state, and the output voltage $V_{OUT}$ is expressed by the following Equation.

$$V_{OUT} = V_{REGOUT} - \Delta V_{CP} = V_{CC} - \Delta V_{LDO} - \Delta V_{CP}$$

The section from $t_1$ to $t_2$ is referred to as a through mode.

When the output voltage $V_{OUT}$ decreases to the threshold voltage $V_{TH(CP)}$ at time $t_2$, the charge pump circuit 120 enters the enable state, and the output voltage $V_{OUT}$ is stabilized at the second target voltage $V_{OUT(REF2)}$. A section subsequent to time $t_2$ is referred to as a charge pump (CP) mode.

The above operation is the operation of the power supply circuit 100. According to the power supply circuit 100, the output voltage $V_{OUT}$ can be maintained in a predetermined voltage range (from $V_{OUT(REF2)}$ to $V_{OUT(REF1)}$) in a wide input voltage $V_{CC}$.

Advantages of the power supply circuit 100 of FIG. 1 will be clarified by comparison with a comparative technique.

Comparative Technique

Figure 3:
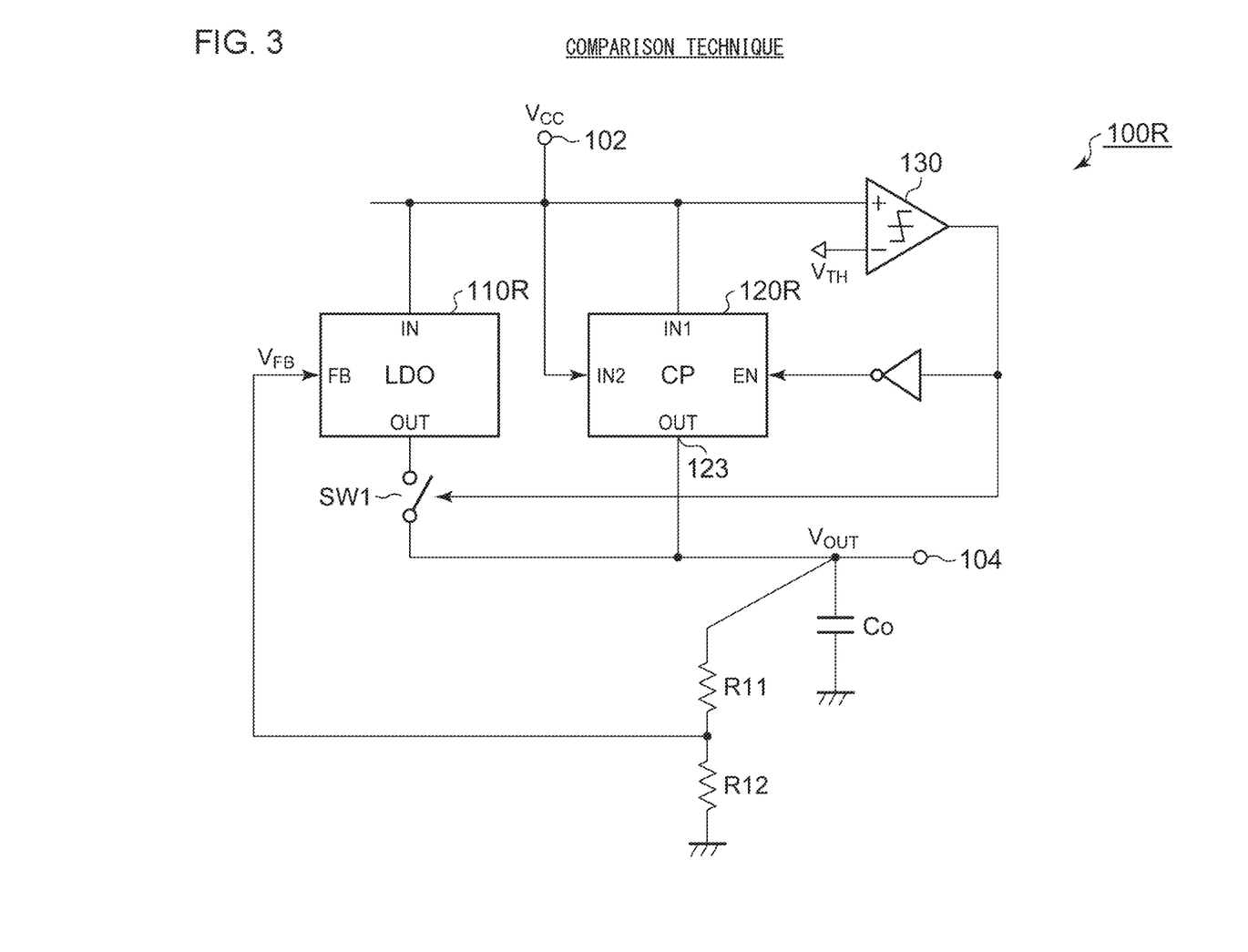
FIG. 3 is a circuit diagram of a power supply circuit according to a comparative technique.

FIG. 3 is a circuit diagram of a power supply circuit 100R according to the comparative technique. The power supply circuit 100R includes a linear regulator 110R and a charge pump circuit 120R, but a connection relationship therebetween is different from the connection relationship of the power supply circuit 100 in FIG. 1. That is, in the comparative technique, the linear regulator 110R and the charge pump circuit 120R are completely connected in parallel and operate in a complementary manner. Specifically, the input voltage $V_{CC}$ is compared with a threshold voltage $V_{TH}$ by the comparator 130, and when $V_{CC} > V_{TH}$, a switch SW1 connected to an output of the linear regulator 110R is turned on, the linear regulator 110R enters an enable state, and the output voltage $V_{OUT}$ is stabilized to the target voltage $V_{OUT(REF1)}$. At this time, the charge pump circuit 120R is in a disabled state.

When $V_{CC} < V_{TH}$, the switch SW1 connected to the output of the linear regulator 110R is turned off, and the linear regulator 110R enters the disabled state. At this time, the charge pump circuit 120R enters the enable state. In the enable state, the charge pump circuit 120R stabilizes the output voltage $V_{OUT}$ to the target voltage $V_{OUT(REF2)}$. In the comparative technique, the target voltage is determined such that $V_{OUT(REF2)} \geq V_{OUT(REF1)}$ is satisfied.

The above configuration is the configuration of the power supply circuit 100R. In the power supply circuit 100R, the linear regulator 110R and the charge pump circuit 120R operate complementarily in response to a comparison result between the input voltage $V_{CC}$ and the threshold voltage $V_{TH}$. Thus, there is a problem that the operation becomes discontinuous during switching.

The power supply circuit 100 according to the embodiment is different from the comparative technique in that the linear regulator 110 constantly operates. In addition, two target voltages $V_{OUT(REF1)}$ and $V_{OUT(REF2)}$ are determined to satisfy $V_{OUT(REF2)} < V_{OUT(REF1)}$. As a result, as illustrated in FIG. 2, the through mode is inserted between the LDO mode and the CP mode, and thus, continuous transition can be realized.

The present disclosure extends to various apparatuses and methods understood as the block diagram or the circuit diagram of FIG. 1 or derived from the above description and is not limited to a specific configuration. Hereinafter, more specific configuration examples and examples will be described in order not to narrow the scope of the present disclosure but to help understanding the essence and operation of the present disclosure and the present invention and to clarify the essence and operation.

First Example

Figure 4:
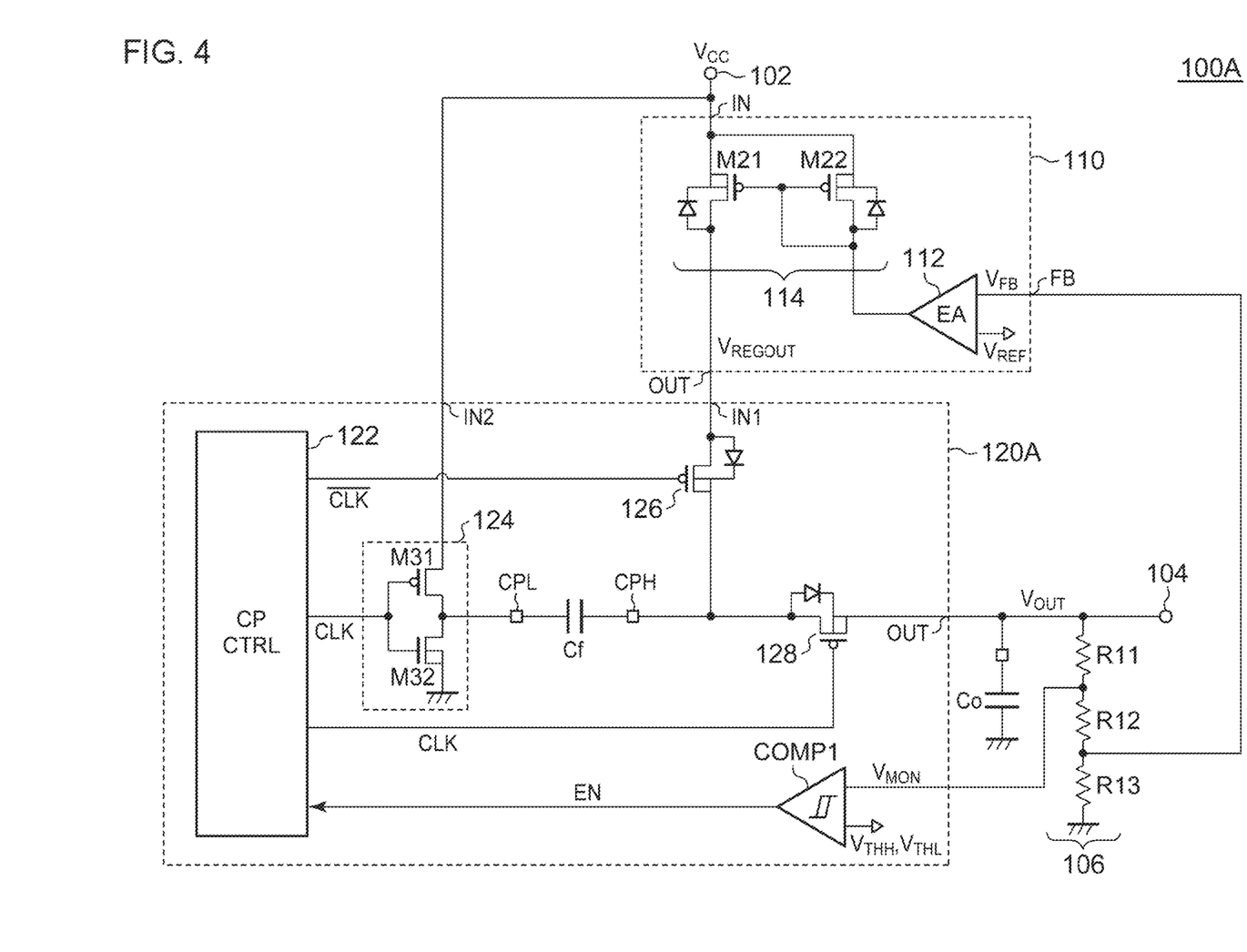
FIG. 4 is a circuit diagram of a power supply circuit according to a first example.

FIG. 4 is a circuit diagram of a power supply circuit 100A according to a first example. A linear regulator 110 includes an error amplifier 112 and an output stage 114. The output stage 114 includes a first transistor M21 and a second transistor M22. A source of the first transistor M21 is connected to an input node IN, and a drain is connected to an output node OUT. A source of the second transistor M22 is connected to the input node IN, and a gate and a drain are connected to a gate of the first transistor M21. The error amplifier 112 receives a feedback voltage $V_{FB}$ and a reference voltage $V_{REF}$ corresponding to an output voltage $V_{OUT}$, and an output thereof is connected to the gate of the first transistor M21 and the gate and the drain of the second transistor M22. The error amplifier 112 amplifies an error between the feedback voltage $V_{FB}$ and the reference voltage $V_{REF}$ and feedback-controls a gate voltage of the first transistor M21. The feedback voltage $V_{FB}$ is generated by a voltage divider circuit 106 including resistors R11 to R13 and is expressed by the following Equation.

$$V_{FB} = V_{OUT} \times R13/(R11+R12+R13)$$

The linear regulator 110 stabilizes the output voltage $V_{OUT}$ to the first target voltage $V_{OUT(REF1)}$.

$$V_{OUT(REF1)}=(R11+R12+R13)/R13 \times V_{REF}$$

Note that, a configuration of the linear regulator 110 is not limited to the configuration in FIG. 4. For example, the second transistor M22 may be omitted.

The charge pump circuit 120A includes a flying capacitor Cf, a controller 122, a driver circuit 124, a first rectifier element 126, and a second rectifier element 128.

The controller 122 generates a clock signal CLK in an enable state of the charge pump circuit 120A.

The driver circuit 124 is connected to a second input node IN2 and receives an input voltage $V_{CC}$. The driver circuit 124 alternately applies the input voltage $V_{CC}$ and a ground voltage (0 V) to a first end CPL of the flying capacitor Cf in response to the clock signal CLK. The driver circuit 124 is, for example, an inverter, and includes transistors M31 and M32.

The first rectifier element 126 is connected between a first input node IN1 and a second end CPH of the flying capacitor Cf. The second rectifier element 128 is connected between a second end CPH of the flying capacitor Cf and the output node OUT. In the first example, the first rectifier element 126 and the second rectifier element 128 are P-channel MOSFETs.

An inverted clock signal/CLK is input to a gate of the first rectifier element 126, and a clock signal CLK is input to a gate of the second rectifier element 128.

A free-run operation of the charge pump circuit 120A will be described. The charge pump circuit 120A alternately repeats a state φ1 where the clock signal CLK is high and a state φ2 where the clock signal CLK is low.

In the state φ1 in which the clock signal CLK is high, the first rectifier element 126 is turned on, an output of the driver circuit 124 is low (0 V), and the second rectifier element 128 is turned off. In this state, the flying capacitor Cf is charged with an intermediate voltage $V_{REGOUT}$ at the first input node IN1.

In the state φ2 where the clock signal CLK is low, the first rectifier element 126 is turned off, the output of the driver circuit 124 is high ($V_{CC}$), and the second rectifier element 128 is turned off. In this state, an output capacitor Co connected to the output node OUT is charged by the following Equation.

$$V_{OUT}=V_{CC}+V_{REGOUT}$$

In a free-run state where two states are repeated, the output voltage $V_{OUT}$ is generated at the output terminal 104.

$$V_{OUT}=V_{CC}+V_{REGOUT}$$

As described above, the charge pump circuit 120A has a regulation function, and does not free-run in the enable state and stabilizes the output voltage $V_{OUT}$ to a second target voltage $V_{OUT(REF2)}$. For the voltage regulation, the charge pump circuit 120A includes a first comparator COMP1.

The first comparator COMP1 is a hysteresis comparator and compares a monitoring voltage $V_{MON}$ corresponding to the output voltage $V_{OUT}$ with an upper threshold $V_{THH}$ and a lower threshold $V_{THL}$ corresponding to the second target voltage $V_{OUT(REF2)}$. The monitoring voltage $V_{MON}$ is expressed by the following Equation.

$$V_{MON}=V_{OUT} \times (R12+R13)/(R11+R12+R13)$$

The first comparator COMP1 generates an enable signal EN corresponding to a relationship between the monitoring voltage $V_{MON}$, the upper threshold $V_{THH}$, and the lower threshold $V_{THL}$.

Specifically, when the monitoring voltage $V_{MON}$ becomes lower than the lower threshold $V_{THL}$, the enable signal EN becomes asserted (first level, for example, high). When the monitoring voltage $V_{MON}$ exceeds the upper threshold $V_{THH}$, the enable signal EN becomes negated (second level, for example, low).

The controller 122 enters an operation period and generates the clock signals CLK and /CLK when the enable signal EN is asserted and enters a stop period and stops the generation of the clock signals CLK and /CLK when the enable signal EN is negated.

In the enable state of the charge pump circuit 120A, the controller 122 preferably fixes the gate of the MOSFET that is the first rectifier element 126 and the gate of the MOSFET that is the second rectifier element 128 to low and brings two MOSFETs into a full-on state. Accordingly, a voltage drop $\Delta V_{CP}$ across the charge pump circuit 120A in a disabled state can be decreased to reduce a loss.

The above configuration is the configuration of the power supply circuit 100A. Next, an operation thereof will be described.

Figure 5:
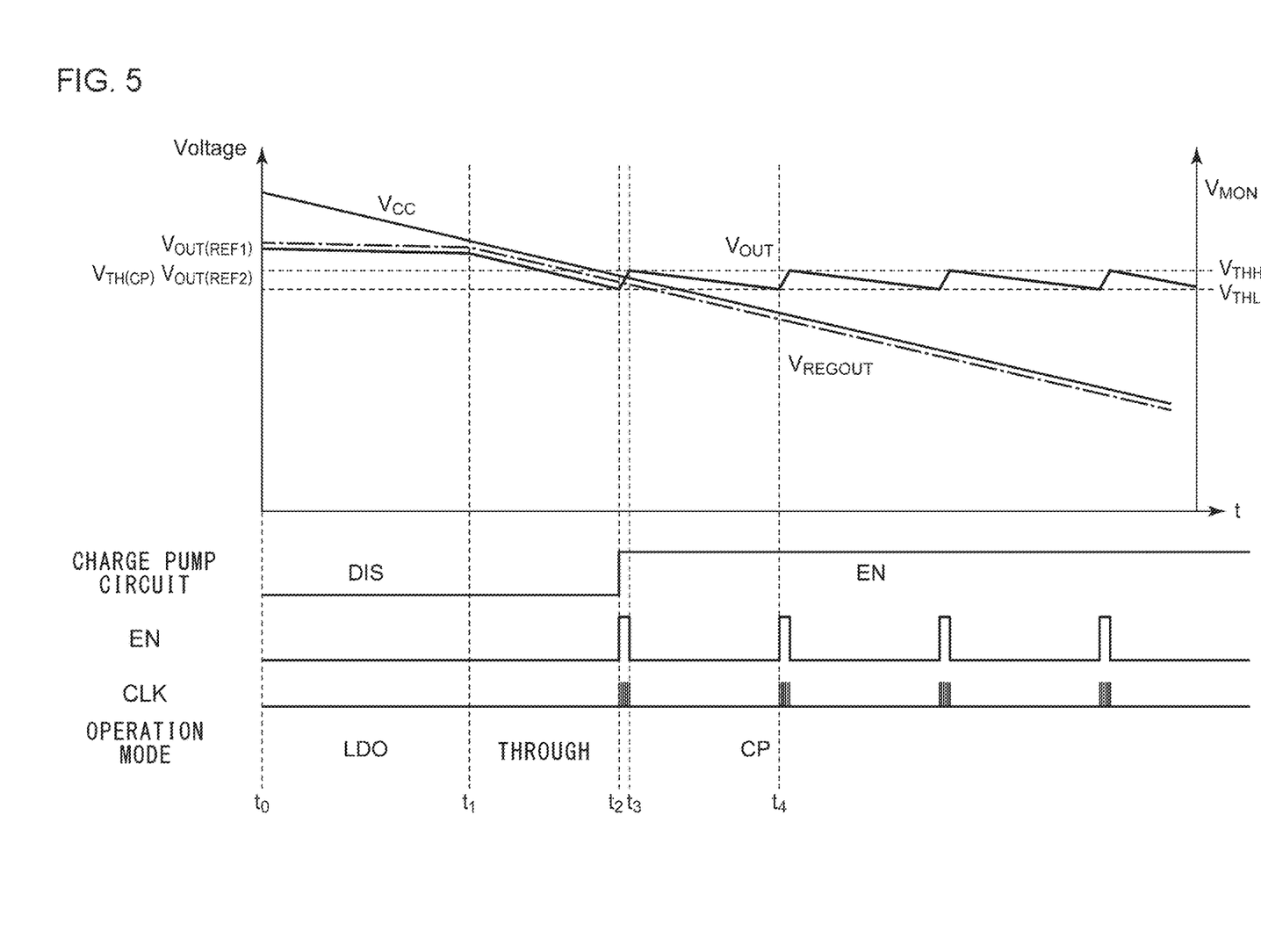
FIG. 5 is an operation waveform diagram of the power supply circuit of FIG. 4.

FIG. 5 is an operation waveform diagram of the power supply circuit 100A of FIG. 4. An operation from time $t_0$ to time $t_2$ is similar to the operation in FIG. 2. At time $t_2$, when the monitoring voltage $V_{MON}$ decreases to the lower threshold $V_{THL}$, the enable signal EN is asserted and the clock signal CLK is generated. In the operation period in which the clock signal CLK is generated, the output voltage $V_{OUT}$ rises. As the output voltage $V_{OUT}$ rises, the monitoring voltage $V_{MON}$ rises. When the monitoring voltage $V_{MON}$ exceeds the upper threshold $V_{THH}$ at time $t_3$, the enable signal EN is negated, the clock signal CLK stops, and the stop period starts. During the stop period, the output capacitor Co is discharged by the load electric current, the output voltage $V_{OUT}$ decreases, and the monitoring voltage $V_{MON}$ also decreases.

When the monitoring voltage $V_{MON}$ decreases to the lower threshold $V_{THL}$ at time $t_4$, the enable signal EN is asserted again, and the operation period starts. Thereafter, the same operation is repeated.

The above operation is the operation of the power supply circuit 100A. The enable signal EN repeats high and low such that the monitoring voltage $V_{MON}$ is included between two thresholds $V_{THH}$ and $V_{THL}$, and the charge pump circuit 120A alternately repeats the operation period and the stop period. As a result, the output voltage $V_{OUT}$ is stabilized within a voltage range with an upper limit of $V_{THH} \times (R11+R12+R13)/(R12+R13)$ and a lower limit of $V_{THL} \times (R11+R12+R13)/(R12+R13)$. A state where the enable signal EN repeats high and low is the enable state of the charge pump circuit 120A.

When a state where the output voltage $V_{OUT}$ exceeds $V_{THL} \times (R11+R12+R13)/(R12+R13)$ is maintained, the enable signal EN remains negated. This state is the disabled state of the charge pump circuit 120A.

That is, the first comparator COMP1 has a function of switching between the enable state and the disabled state of the charge pump circuit 120A and a regulation function in the enable state. Since the charge pump circuit 120A is operating when $V_{OUT}<V_{THL} \times (R11+R12+R13)/(R12+R13)$, it is considered that $V_{THL} \times (R11+R12+R13)/(R12+R13)$ corresponds to the above-described threshold voltage $V_{TH(CP)}$.

Second Example

Figure 6:
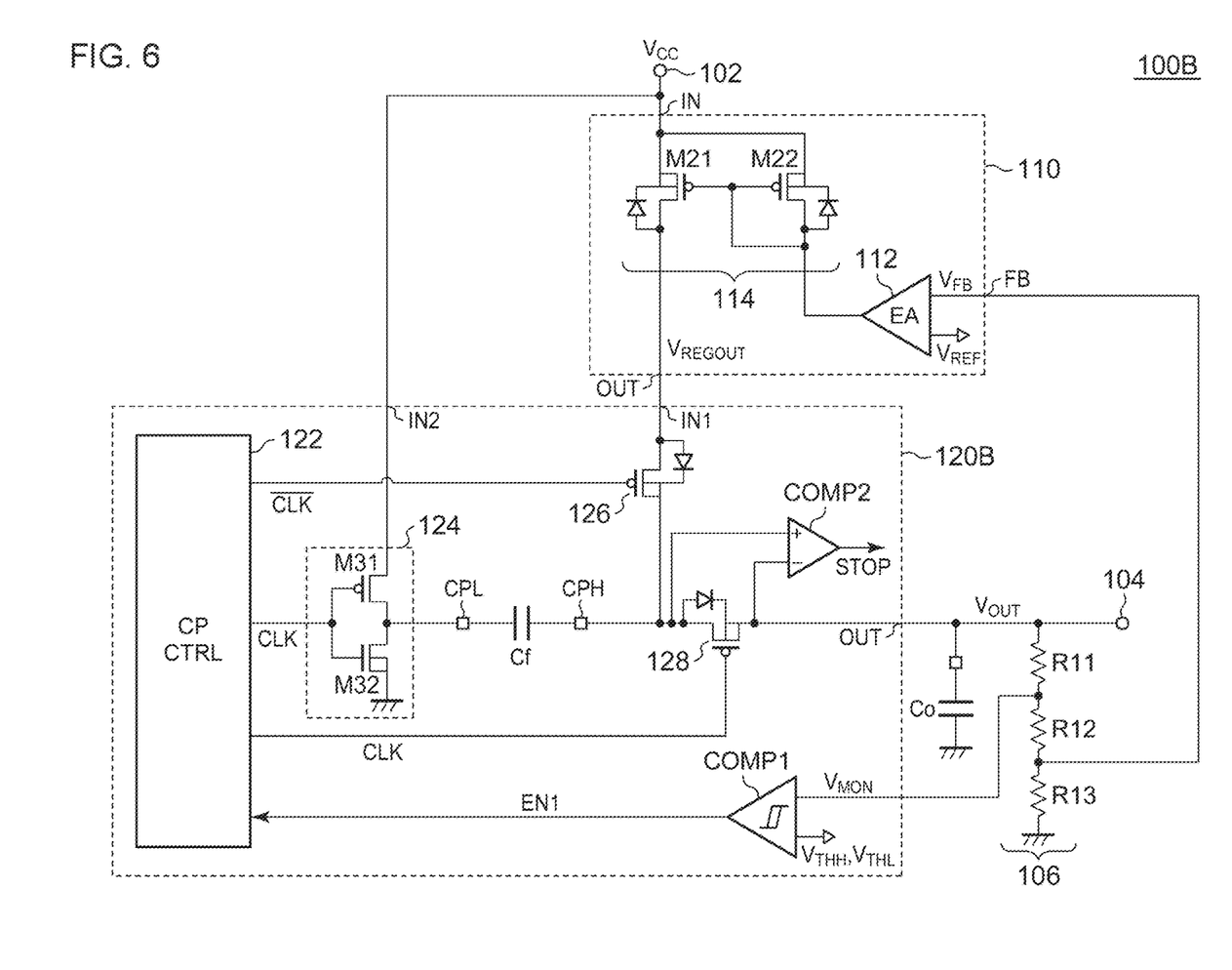
FIG. 6 is a circuit diagram of a power supply circuit according to a second example.

FIG. 6 is a circuit diagram of a power supply circuit 100B according to a second example. A difference from the first example is a configuration of a charge pump circuit 120B. The charge pump circuit 120B further includes a second comparator COMP2 in addition to the charge pump circuit 120A of FIG. 4.

The second comparator COMP2 becomes active in an enable state of the charge pump circuit 120B. The second comparator COMP2 compares an output voltage $V_{OUT}$ with a voltage at a second end CPH of a flying capacitor Cf while a first end CPL of the flying capacitor Cf is low. When the output voltage $V_{OUT}$ is lower, a stop signal STOP is asserted.

When the stop signal STOP is asserted, a controller 122 forcibly disables the charge pump circuit 120B.

The above operation is the operation of the power supply circuit 100B.

The second comparator COMP2 becomes active in the state φ1 in which a clock signal CLK is high and in a period in which a first rectifier element 126 is turned on. At this time, a voltage at a second end CPH of the flying capacitor Cf is an intermediate voltage $V_{REGOUT}$. That is, the second comparator COMP2 compares the output voltage $V_{OUT}$ with the intermediate voltage $V_{REGOUT}$.

In a case where a capability of the charge pump circuit 120B is smaller than a load electric current, when the charge pump circuit 120B is operated, a situation in which the output voltage $V_{OUT}$ is lower than the intermediate voltage $V_{REGOUT}$ may occur. In the power supply circuit 100B according to the example, this situation can be detected by the second comparator COMP2. When $V_{OUT} < V_{REGOUT}$ is satisfied, the intermediate voltage $V_{REGOUT}$ can be output as the output voltage $V_{OUT}$ by setting the charge pump circuit 120B to enter the disabled state, and the output voltage $V_{OUT}$ higher than that in the case of operating the charge pump circuit 120B can be supplied to the load.

Third Example

Figure 7:
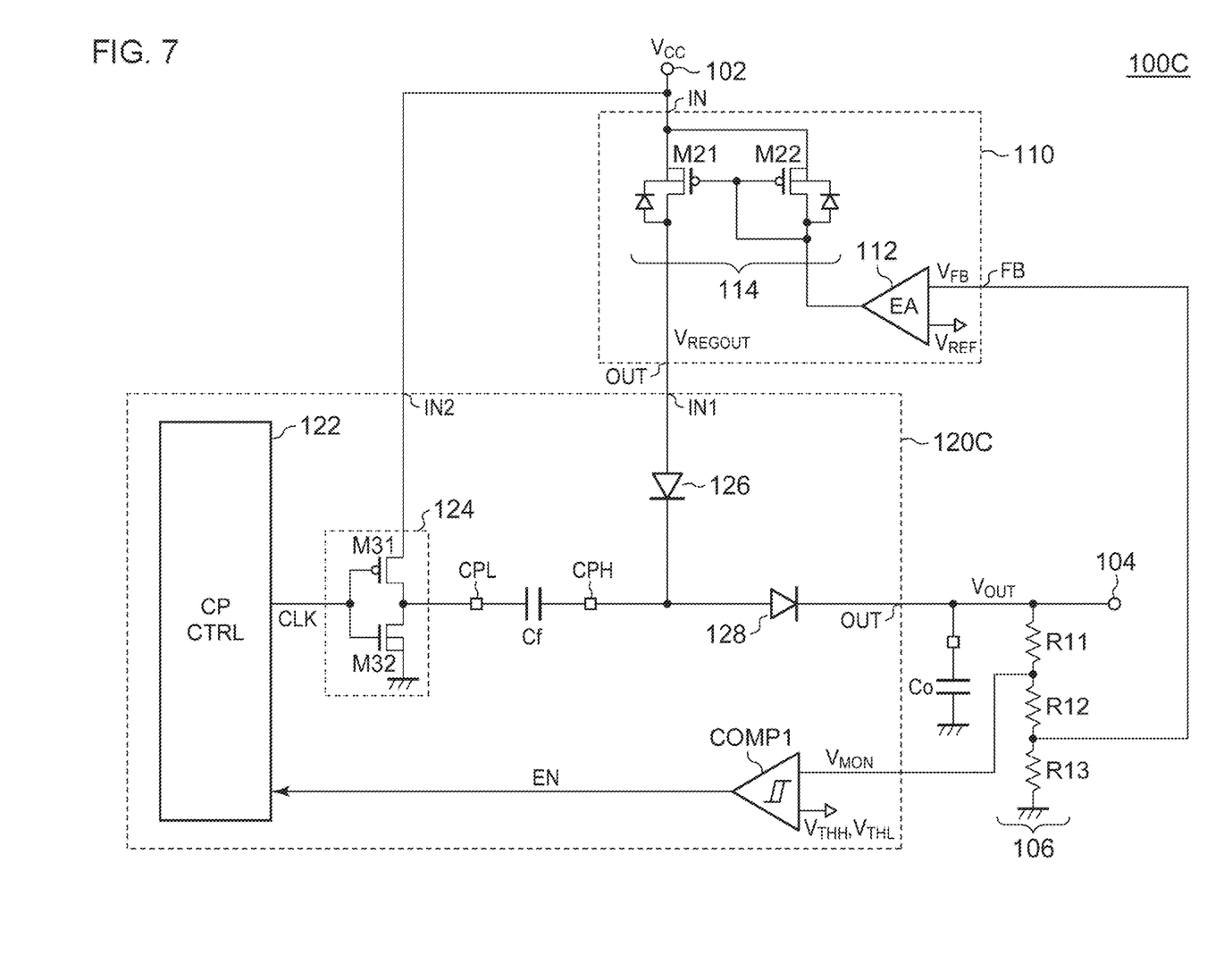
FIG. 7 is a circuit diagram of a power supply circuit according to a third example.

FIG. 7 is a circuit diagram of a power supply circuit 100C according to a third example. A difference from FIG. 4 is a configuration of a charge pump circuit 120C. In the charge pump circuit 120C, each of a first rectifier element 126 and a second rectifier element 128 includes a diode.

Fourth Example

Figure 8:
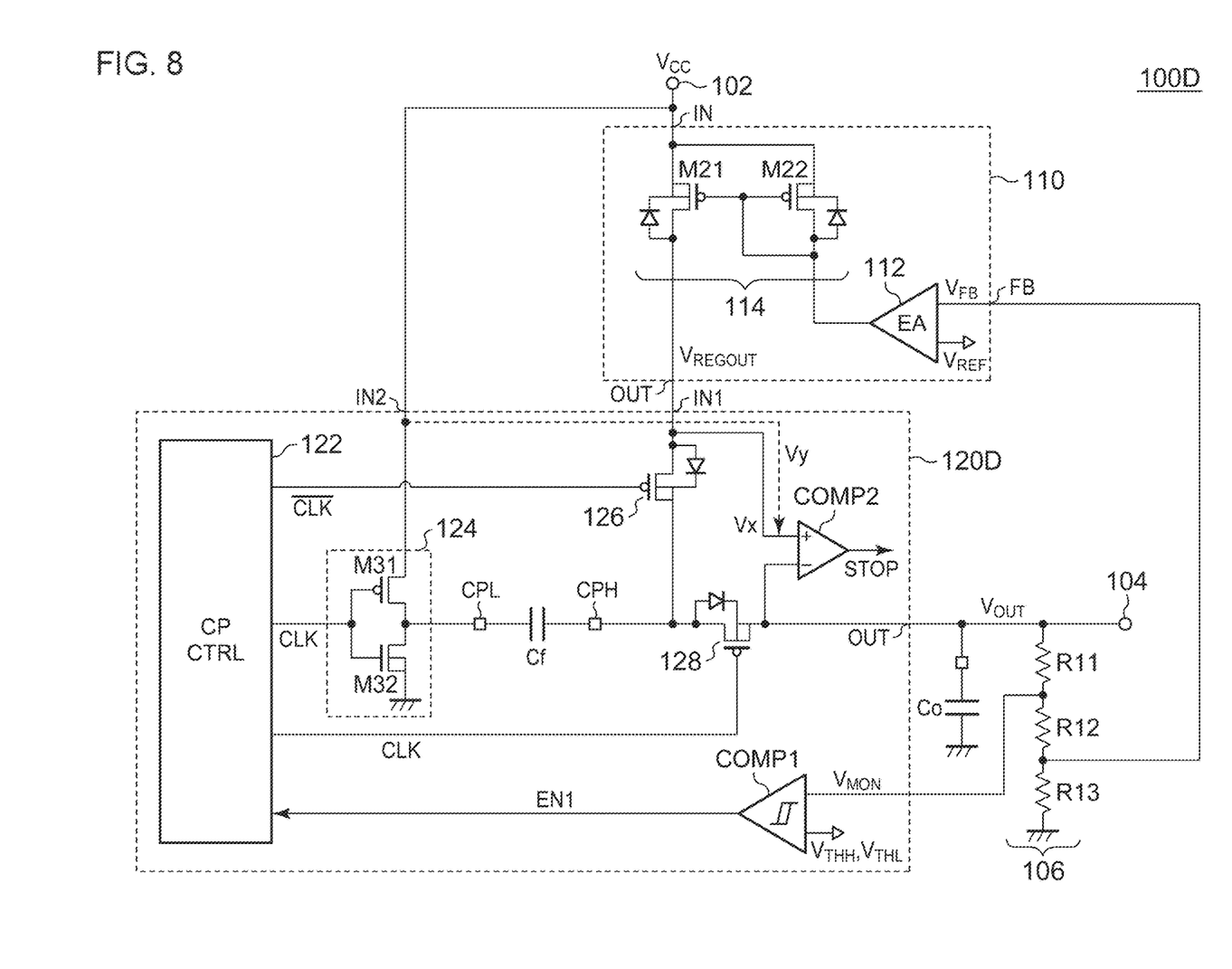
FIG. 8 is a circuit diagram of a power supply circuit according to a fourth example.

FIG. 8 is a circuit diagram of a power supply circuit 100D according to a fourth example. In a charge pump circuit 120D, a second comparator COMP2 compares a voltage Vx corresponding to an intermediate voltage $V_{REGOUT}$ with an output voltage $V_{OUT}$. The voltage Vx may be the intermediate voltage $V_{REGOUT}$ itself or may be a voltage obtained by lowering the intermediate voltage $V_{REGOUT}$ by a predetermined voltage width. According to the configuration of FIG. 8, a function similar to the function of the third example can be realized. Furthermore, voltage comparison can be performed regardless of states φ1 and φ2 of the charge pump circuit 120D.

Alternatively, the second comparator COMP2 may compare a voltage Vy corresponding to an input voltage $V_{CC}$ with the output voltage $V_{OUT}$. The voltage Vy may be the input voltage $V_{CC}$ itself or a voltage obtained by lowering the input voltage $V_{CC}$ by a predetermined voltage width.

As described above, when the input voltage $V_{CC}$ decreases, $V_{REGOUT} = V_{CC} - \Delta V_{LDO}$, and the input voltage $V_{CC}$ and the intermediate voltage $V_{REGOUT}$ are substantially equal. Therefore, the function similar to the function of the third example can be realized by comparing an input voltage $V_{IN}$ with the output voltage $V_{OUT}$ instead of the intermediate voltage $V_{REGOUT}$.

MODIFIED EXAMPLES

It is understood by those skilled in the art that the above-described embodiments are examples, and various modified examples can be made to combinations of the components and the processing processes. Hereinafter, such modified examples will be described.

First Modified Example

In the power supply circuits 100B and 100D of FIGS. 6 and FIG. 8, the rectifier elements 126 and 128 may be diodes.

Second Modified Example

The implementation of a linear regulator 110 with a regulation function is not limited to an intermittent operation using a hysteresis comparator. For example, a feedback loop using an error amplifier may be incorporated to implement the regulation function.

Application

Figure 9:
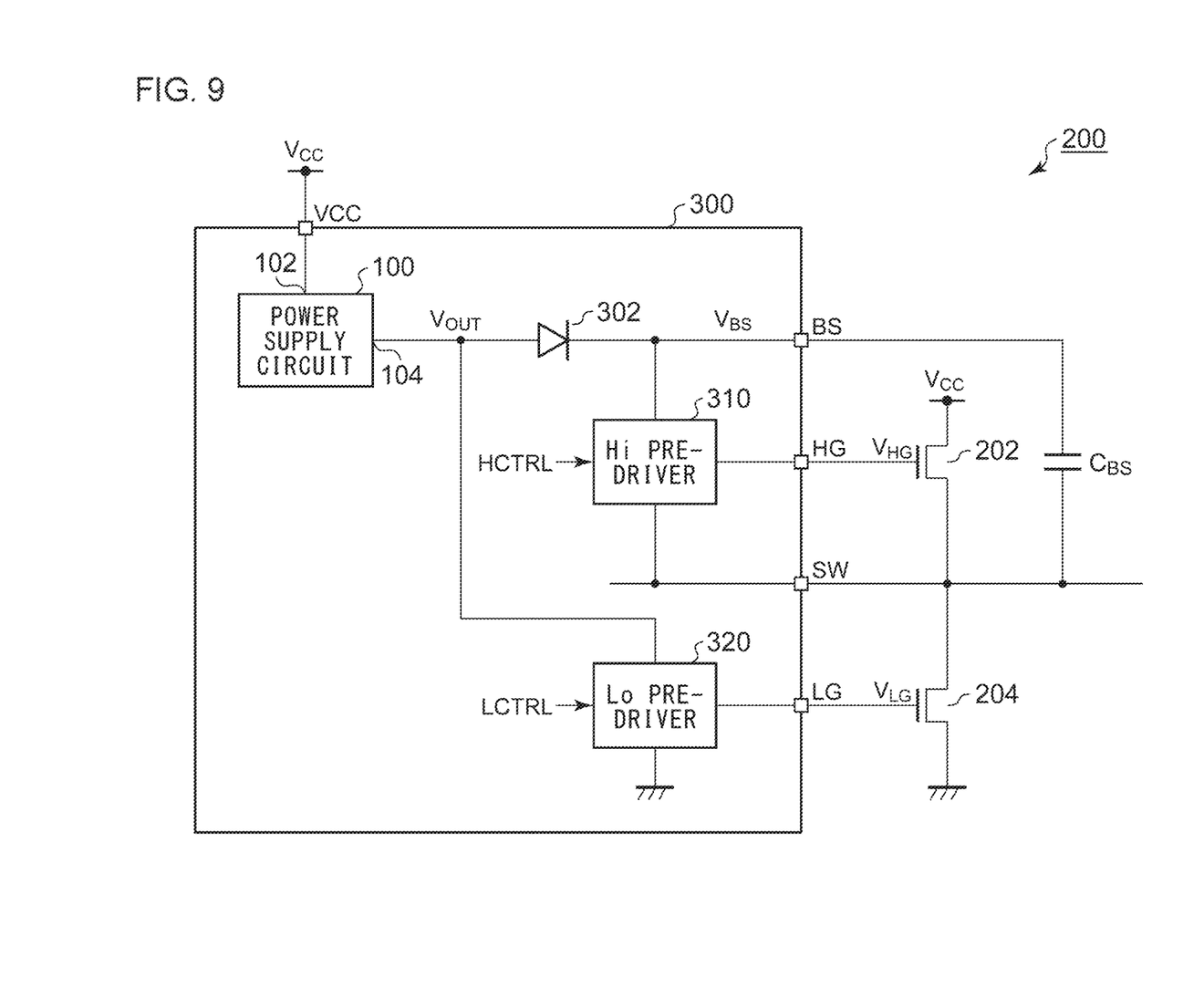
FIG. 9 is a block diagram of a switching circuit.

FIG. 9 is a block diagram of a switching circuit 200. The switching circuit 200 includes a high-side transistor 202, a low-side transistor 204, a gate driver circuit 300, and a bootstrap capacitor CBS. The high-side transistor 202 and the low-side transistor 204 are N-channel transistors. The high-side transistor 202 and the low-side transistor 204 may be FETs made of Si, SiC, and GaN, or may be IGBTs or bipolar transistors.

The gate driver circuit 300 includes a power supply pin VCC, a bootstrap pin BS, a high-side gate pin HG, a low-side gate pin LG, a switching pin SW, a high-side pre-driver 310, a low-side pre-driver 320, a rectifier element 302 for bootstrap, and a power supply circuit 100.

A bootstrap capacitor CBS is externally attached between the BS pin and the SW pin.

The HG pin is connected to a gate of the high-side transistor 202, and the LG pin is connected to a gate of the low-side transistor 204.

An output of the high-side pre-driver 310 is connected to the gate of the high-side transistor 202 with the HG pin interposed therebetween, and an output of the low-side pre-driver 320 is connected to the gate of the low-side transistor 204 with the LG pin interposed therebetween. An input terminal 102 of the power supply circuit 100 receives an input voltage $V_{CC}$ with the VCC pin interposed therebetween. The rectifier element 302 is provided between an output terminal 104 of the power supply circuit 100 and the BS pin. A voltage $V_{BS}$ at the BS pin is supplied to an upper terminal of the high-side pre-driver 310, and a lower terminal of the high-side pre-driver 310 is connected to the SW pin. In response to a control signal HCTRL, the high-side pre-driver 310 supplies a gate voltage $V_{HG}$ for setting $V_{BS}$ to high and $V_{SW}$ too low to the gate of the high-side transistor 202.

An output voltage $V_{OUT}$ of the power supply circuit 100 is supplied to an upper terminal of the low-side pre-driver 320, and a lower terminal is grounded. The low-side pre-driver 320 supplies a gate voltage VLG for setting $V_{OUT}$ to high and 0 V too low to the gate of the low-side transistor 204 in response to a control signal LCTRL.

An example of the switching circuit is a motor driver circuit.

Figure 10:
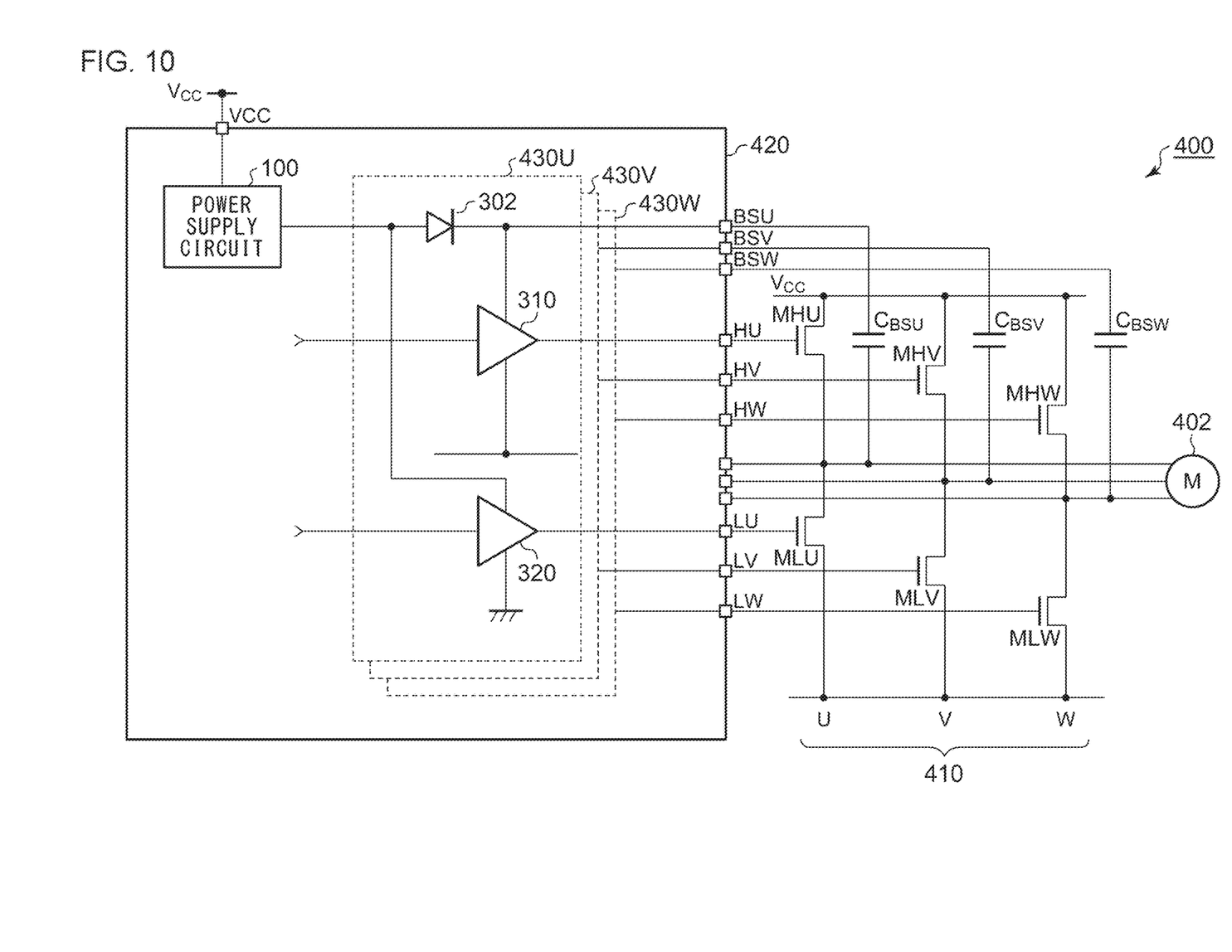
FIG. 10 is a block diagram of a motor driver.

FIG. 10 is a block diagram of a motor driver circuit 400. The motor driver circuit 400 drives a three-phase motor 402. The motor driver circuit 400 includes a three-phase inverter 410 and a gate driver circuit 420. The three-phase inverter 410 includes legs of three phases U, V, and W, and the leg of each phase includes a high-side transistor MIR as an upper arm and a low-side transistor ML as a lower arm.

The gate driver circuit 420 includes the power supply circuit 100 and gate driver circuits 430U, 430V, and 430W of U-phase, V-phase, and W-phase. The gate driver circuit 430 of each phase includes a rectifier element 302, a high-side pre-driver 310, and a low-side pre-driver 320.

The application of the power supply circuit 100 is not limited to the motor driver circuit and can be used for other applications including a switching circuit including a high-side transistor and a low-side transistor. For example, the power supply circuit 100 can be used as a DC/DC converter or the like. Furthermore, the application of the power supply circuit 100 is not limited to the switching circuit and may be used for any IC.

Although the embodiments according to the present disclosure have been described by using specific terms, this description is merely an example for assisting understanding, and does not limit the present disclosure or the claims. The scope of the present invention is defined by the claims, and therefore, embodiments, examples, and modified examples that are not described herein are also included in the scope of the present invention.

What is claimed is:

1. A power supply circuit comprising:
   an input terminal to be connected to receive an input voltage;
   an output terminal to be connected to a load;
   a linear regulator having an input node connected to the input terminal, and an output node, and structured to adjust an intermediate voltage at the output node such that an output voltage at the output terminal approaches a first target voltage; and
   a Dixon-type charge pump circuit having a first input node connected to receive the intermediate voltage, a second input node connected to receive the input voltage, and an output node connected to the output terminal,
   wherein the charge pump circuit is structured to enter a disable state when the output voltage is higher than a threshold voltage determined to be lower than the first target voltage, to output a voltage at the first input node to the output node in the disable state, to enter an enable state when the output voltage is lower than the threshold voltage, and to stabilize the output voltage to a second target voltage determined to be lower than the first target voltage in the enable state.

2. The power supply circuit according to claim 1, wherein the charge pump circuit includes a first comparator having hysteresis for comparing a monitoring voltage corresponding to the output voltage with an upper threshold and a lower threshold corresponding to the second target voltage, and
   the charge pump circuit repeats an operation period and a stop period in response to an output of the first comparator in the enable state.

3. The power supply circuit according to claim 1, wherein the charge pump circuit includes:
   a flying capacitor;
   a driver circuit structured to alternately apply the input voltage and a ground voltage to a first end of the flying capacitor in the enable state,
   a first rectifier element provided between the first input node and a second end of the flying capacitor, and
   a second rectifier element provided between the second end of the flying capacitor and the output node.

4. The power supply circuit according to claim 3, wherein the charge pump circuit further includes a second comparator structured to compare the output voltage with a voltage at the second end of the flying capacitor in a section in which the first end of the flying capacitor is low during a period in which the charge pump circuit is in the enable state, and structured to assert a stop signal when the output voltage is lower, and
   the charge pump circuit enters the disabled state when the stop signal is asserted.

5. The power supply circuit according to claim 3, wherein the first rectifier element is a first synchronization rectifier transistor structured to be switched between on and off states in the enable state, and to be in on state in the disabled state, and
   the second rectifier element is a second synchronization rectifier transistor structured to be complementarily switched with the first synchronization rectifier transistor in the enable state, and to be in an on state in the disabled state.

6. The power supply circuit according to claim 3, wherein the first rectifier element and the second rectifier element are diodes.

7. The power supply circuit according to claim 1, wherein the charge pump circuit further includes a second comparator structured to compare the output voltage with the intermediate voltage, and to assert a stop signal when the output voltage is lower, and
   the charge pump circuit enters the disabled state when the stop signal is asserted.

8. The power supply circuit according to claim 1, wherein the charge pump circuit further includes a second comparator structured to compare the output voltage with a voltage based on the input voltage, and to assert a stop signal when the output voltage is lower, and
   the charge pump circuit enters the disabled state when the stop signal is asserted.

9. The power supply circuit according to claim 1, wherein the linear regulator includes
   a first transistor having a source connected to the input node and a drain connected to the output node,
   a second transistor having a source connected to the input node, a gate and a drain connected to a gate of the first transistor, and
   an error amplifier connected to receive a reference voltage and a feedback voltage corresponding to the output voltage, and having an output connected to a gate of the first transistor and the gate and the drain of the second transistor.

10. The power supply circuit according to claim 1, wherein the power supply circuit is integrated to one semiconductor substrate.

* * * * *